United States Patent [19]

Galkiewicz et al.

[11] 4,073,776

[45] Feb. 14, 1978

[54] TACKIFIERS FOR ELASTOMERS

[75] Inventors: Thomas M. Galkiewicz, Schenectady; Kenneth C. Petersen, Scotia; John L. Sullivan, Ballston Lake, all of N.Y.

[73] Assignee: Schenectady Chemicals, Inc., Schenectady, N.Y.

[21] Appl. No.: 544,772

[22] Filed: Jan. 28, 1975

[51] Int. Cl.² .................. C08G 8/20; C08G 16/04
[52] U.S. Cl. .................. 260/51 EP; 260/3; 260/52; 260/53 R; 260/59 R; 260/831
[58] Field of Search .............. 260/831, 836, 51 EP; 260/3, 23.7 M, 837 R

[56] References Cited

U.S. PATENT DOCUMENTS

| | | | |
|---|---|---|---|
| 2,476,824 | 7/1949 | Albert | 260/48 |
| 2,521,912 | 9/1950 | Greenlee | 260/59 |
| 2,521,912 | 9/1950 | Greenlee | 260/831 |
| 2,633,458 | 3/1951 | Shokal | 260/45.2 |
| 2,920,990 | 1/1960 | Been et al. | 154/43 |
| 2,940,880 | 6/1960 | Johnson | 154/129 |
| 3,027,337 | 3/1962 | Tritsch | 260/5 |
| 3,030,332 | 4/1962 | Lombardi et al. | 260/43 |
| 3,099,632 | 7/1963 | De'Crease | 260/3.3 |
| 3,100,160 | 8/1963 | Korpman | 117/122 |
| 3,124,548 | 3/1964 | Yaroch | 260/49 |
| 3,207,718 | 9/1965 | Zimmerman et al. | 260/29.6 |
| 3,228,911 | 1/1966 | Rogler | 260/47 |
| 3,294,866 | 12/1966 | Soldatos | 260/845 |
| 3,316,195 | 4/1967 | Grosner et al. | 260/29.6 |
| 3,331,804 | 7/1967 | Foglel | 260/33.6 |
| 3,352,813 | 11/1967 | Hayes | 260/31.8 |
| 3,386,955 | 6/1968 | Nawakowski et al. | 260/47 |
| 3,431,241 | 3/1969 | Moult et al. | 260/54 |
| 3,437,610 | 4/1969 | Moult | 260/3 |
| 3,451,950 | 6/1969 | Clarke et al. | 260/2 |
| 3,466,347 | 9/1969 | Davis | 260/837 |
| 3,472,915 | 10/1969 | Rider | 260/839 |
| 3,483,075 | 12/1969 | Schmitt | 161/227 |
| 3,494,888 | 2/1970 | McElroy | 260/47 |
| 3,496,250 | 2/1970 | Czerwinski | 260/836 |
| 3,501,434 | 3/1970 | Chadwick et al. | 260/33.6 |
| 3,502,609 | 3/1970 | Barie et al. | 260/37 |
| 3,525,703 | 8/1970 | Iwami et al. | 260/5 |
| 3,525,779 | 8/1970 | Hawkins | 260/830 |
| 3,527,725 | 9/1970 | Strauss et al. | 260/29.3 |
| 3,528,473 | 9/1970 | Torti et al. | 152/330 |
| 3,535,403 | 10/1970 | Holub et al. | 260/837 |
| 3,538,185 | 11/1970 | Davis et al. | 260/837 |
| 3,554,968 | 1/1971 | Habermeier et al. | 260/47 |
| 3,557,246 | 1/1971 | Foster | 260/837 |
| 3,578,613 | 5/1971 | Tai | 260/3 |
| 3,586,616 | 6/1971 | Kropp | 204/159.11 |
| 3,586,735 | 6/1971 | Giller et al. | 260/845 |
| 3,598,690 | 8/1971 | Danielson | 161/144 |
| 3,616,193 | 10/1971 | Lubowitz et al. | 161/190 |
| 3,634,323 | 1/1972 | Moran | 260/47 EP |
| 3,634,542 | 1/1972 | Dowd et al. | 260/837 |
| 3,635,894 | 1/1972 | Dowbenko et al. | 260/47 |
| 3,636,133 | 1/1972 | Hawkins | 260/824 EP |
| 3,637,579 | 1/1972 | Barie et al. | 260/41 A |
| 3,641,195 | 2/1972 | Ball et al. | 260/837 R |
| 3,644,268 | 2/1972 | Morita | 260/38 |
| 3,655,818 | 4/1972 | McKown | 260/837 R |
| 3,658,637 | 4/1972 | Danielson | 161/231 |
| 3,661,822 | 5/1972 | Lee | 260/23.5 |
| 3,674,724 | 7/1972 | Marzocchi | 260/3 |
| 3,678,130 | 7/1972 | Klapprott et al. | 260/837 R |
| 3,678,131 | 7/1972 | Klapprott et al. | 260/837 R |
| 3,691,133 | 9/1972 | Sura | 260/47 EC |
| 3,697,310 | 10/1972 | Kurihara et al. | 117/76 T |
| 3,705,868 | 12/1972 | Honda et al. | 260/29.7 R |
| 3,707,583 | 12/1972 | McKown | 260/837 |
| 3,715,266 | 2/1973 | Winters et al. | 161/140 |
| 3,725,322 | 4/1973 | Weidner | 260/831 |
| 3,728,192 | 4/1973 | Kindle et al. | 156/306 |
| 3,753,755 | 8/1973 | Olson | 117/3.1 |
| 3,756,969 | 9/1973 | Danielson | 260/3 |
| 3,756,984 | 9/1973 | Klaren et al. | 260/47 EC |
| 3,767,624 | 10/1973 | Clarke | 260/59 |
| 3,773,856 | 11/1973 | Takiyama et al. | 260/836 |
| 3,780,132 | 12/1973 | Lohr | 260/831 |
| 3,790,647 | 2/1974 | Kiss et al. | 260/897 |
| 3,793,398 | 2/1974 | Hokamura | 260/835 |
| 3,862,260 | 1/1975 | Sellers et al. | 260/831 |
| 3,871,896 | 3/1975 | Matsudaira et al. | 260/831 |

FOREIGN PATENT DOCUMENTS 784,565  10/1957  United Kingdom.

OTHER PUBLICATIONS

SC:72–60, Product Guide; Epon Resins, Polymers Division, Shell Chem. Co., 09/1972.

*Primary Examiner*—Murray Tillman
*Assistant Examiner*—Thurman K. Page
*Attorney, Agent, or Firm*—Cushman, Darby & Cushman

[57] ABSTRACT

A tackifier system which includes the reaction product of oxirane bearing materials with alkyl phenol novolacs for elastomers of alpha-olefin polymers which are sulfur curable.

The invention is directed to reaction products of alkyl phenol novolacs with oxirane bearing materials. The reaction products of alkyl phenol novolacs with oxirane bearing materials have been found to be excellent tackifiers for various types of elastomers.

Further, the invention is directed to elastomer compositions containing reaction products of alkyl phenol novolacs with oxirane bearing materials. Elastomer compositions containing the reaction products of alkyl phenol novolac resins with oxirane bearing materials exhibit excellent tack properties.

Tackifiers are employed in elastomeric compositions to produce wider practical ranges of elastomer properties, such as stiffness and tack. Tackifiers are used to improve adhesion, and sometimes cohesion without necessarily stiffening or softening the elastomer composition.

The tackifiers of the invention are particularly useful in elastomer products which require green tack in their construction. These elastomers include hydrocarbon or hydrocarbon-acrylonitrile, or halohydrocarbon elastomers. Normally-solid elastomers which are alpha-olefin (e.g. monoolefin or diolefin) hydrocarbon polymers which are sulfur curable are becoming increasingly important for producing a variety of useful products.

For broader application, however, such elastomers must be adapted to have excellent tack properties.

For various applications, it is desirable that elastomers have good tack properties prior to curing, in that for bonding purposes it is desirable that the tack property is sufficient to allow the elastomer to bond, on contact, with a force which is sufficiently high to oppose delaminating forces appearing during the fabrication of elastomer products, but low enough to permit clean separation prior to cure if the need arises.

The invention is directed to tackifiers utilized as tire stock tackifiers, cement tackifiers and tackifiers for any rubber application requiring green tack. Examples of rubber products which require good green tack in their construction include tires, belts and hoses.

23 Claims, No Drawings

TACKIFIERS FOR ELASTOMERS

SUMMARY OF THE INVENTION

In accordance with the invention, tackifiers comprising the reaction product of an alkyl phenol novolac with oxirane bearing materials have been produced which are useful as tackifiers in elastomer applications requiring good green tack. The tackifiers of the invention are the reaction products of alkyl phenol novolac resins with oxirane bearing materials. In particular, the alkyl phenol novolacs which are reacted with the oxirane bearings material, are formed with alkyl phenols, wherein the alkyl group on the alkyl phenol contains 4 to 16 carbon atoms. These tackifiers are of particular utility in improving the tack of normally-solid, alpha-olefin hydrocarbon polymers which are sulfur-curable. These sulfur-curable alpha-olefin hydrocarbon polymers are referred to in the prior art as elastomers or rubbers and include both natural and synthetic rubbers.

DETAILED DESCRIPTION OF THE INVENTION

The tackifiers of this invention are the reaction products AB. A represents the residue of an alkyl phenol novolac. B represents the residue of an oxirane bearing material. The reaction product of the reaction between an alkyl phenol novolac resin and an oxirane bearing material can be referred to simply as AB.

THE ALKYL PHENOL NOVOLAC RESIN

The alkyl phenol novolac resin is formed by the well known condensation of phenols with aldehydes. According to the invention, the alkyl phenol used is a phenol which is substituted by a hydrocarbon radical, (e.g. alkyl) of 4 to 16 carbon atoms. Conveniently, the alkyl substituent is in the para-position of the phenol moiety. Commercial alkyl phenols can contain minor quantities of disubstituted alkyl phenols, as well as ortho-monosubstituted phenols. P-alkyl phenols, commercially available and containing such disubstituted alkyl phenols and monosubstituted phenols may be used to prepare the tackifiers of the invention. Preferably, the alkyl substituent on the phenol contains 8 to 12 carbon atoms. The alkyl substituent on the phenol can be the straight chain alkyl containing 4 to 16 carbon atoms. The alkyl substituent on the phenol can include the branched chain, i.e. iso and tertiary alkyls of 4 to 16 carbon atoms. Exemplary novolacs are novolacs based on p-tert-butylphenol, p-t-octyl phenol, p-nonyl phenol, p-dodecyl-phenol and p-hexadecylphenol.

The aldehyde used to condense the alkyl phenol can conveniently be formaldehyde. However, formaldehyde can be replaced as a reactant totally or in part by acetaldehyde, acetone, propionaldehyde, isobutyraldehyde, butyraldehyde, or benzaldehyde as defined by the formula for the alkyl phenol novolac

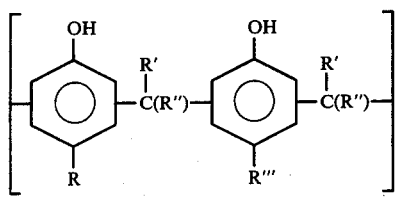

wherein each of R and R''' is the same or different and is an alkyl of 4 to 16 carbon atoms; and wherein R' and R'' are the same or different and can be a hydrogen, a lower alkyl of 1-4 carbon atoms, aromatic, e.g. phenyl, or heterocyclic, e.g., furyl, and if R' is an alkyl group of more than one carbon atom or phenyl or heterocyclic then R'' must be hydrogen.

The condensation of the alkyl phenol with an aldehyde can be undertaken by any convenient method known in the art. Thus, according to the exemplifications, the alkyl phenol, in the presence of an acid catalyst, was reacted with the aldehyde in an inert slvent at reflux temperatures for several hours. In a preferred procedure, prior to the addition of the aldehyde to the alkyl phenol, the alkyl phenol, the acid catalyst and the solvent are brought to reflux temperatures, with subsequent additions of the aldehyde. While any solvent inert to the reaction conditions can be employed, preferably a solvent is employed which has a boiling point of 100° C or more. While xylene was employed as a solvent in the examples, xylene or toluene, or any aromatic solvent inert to the reaction conditions, e.g. aromatic hydrocarbons, having a boiling point of at least 100° C may be used. The choice of solvent is not critical.

OXIRANE BEARING MATERIAL

Any oxirane reactant can be allowed to react with the alkyl phenol novolac to form AB. The epoxy equivalent weight (WPE) of the reactant oxirane bearing materials is between 58 to 4000. Parenthetically, the term oxirane refers to materials containing epoxy groups. Thus, generally, oxirane bearing materials based on mono-, di-, poly-glycidyl ethers, glycidyl esters, glycidyl hydantoins, aliphatic oxiranes, cycloaliphatic oxiranes and aromatic oxiranes can be employed. Glycidyl ethers such as oxirane materials derived from bisphenol A, phenolic novolaks, resorcinol or glycerine can be employed. By glycidylethers is meant mono-, di-, etc., polyglycidylether oxiranes. Glycidyl esters such as the diglycidyl ester of tetrahydrophthalic acid may be employed. The term glycidyl esters is meant to include oxiranes of mono-, di-, and up to polyglycidyl ester oxiranes. Aliphatic oxiranes such as propylene oxide can be employed. The term aliphatic oxiranes is meant to include mono-, di-, poly-aliphatic oxiranes. Cycloaliphatic oxiranes such as oxirane materials based on cyclohexene or substituted cyclohexenes can be employed. The term cycloaliphatic oxiranes includes mono-, di-, up to poly-cycloaliphatic oxiranes. Glycidyl heterocycles such as XB-2793, a difunctional hydantoin epoxy resin have the following structure:

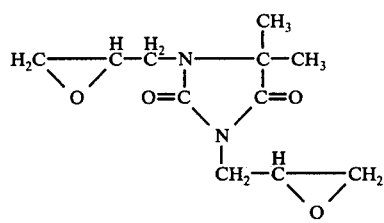

Obviously, the term glycidyl heterocycles includes di- and polyglycidyl heterocycle oxiranes. Aromatic oxiranes such as styrene oxide can be employed. Useful bisphenol A-derived epoxy resins are manufactured by Shell Chemical Company under the trade name Epon resins. Epon resins in the series Epon 828 to Epon 1009, as well as the glycerine derived Epon 812, are epoxy resins which may be used in the invention. Description of the Epon resins and their physical properties are set forth in Lee and Neville "Handbook of Epoxy Resins", Second Edition, McGraw-Hill, pages 4–66, et seq. (1967) hereby incorporated by reference. All of the resins in the Epon series therein are glycidyl ethers of bisphenol A except for Epon 871 and Epon 812 which are aliphatic polyepoxide resins. The epoxy resins of the Epon series, mentioned above, are similar to each other. For instance, Epon 829 is a liquid epoxy resin based on bisphenol A which has substantially the same physical properties as Epon 828. What differentiates Epon 829 from Epon 828 is the inclusion of a small quantity of ethyl triphenyl phosphonium iodide catalyst. The Epon resins have epoxy equivalent weight (WPE) of approximately 140 to 4000.

The oxirane bearing glycidyl ethers and esters used in accordance with the invention are well known in the art. Oxirane bearing glycidyl ethers are prepared by reacting typically epichlorohydrin with a polyhydric alcohol to form the chlorohydrin ether and then treating the chlorohydrin ether with a base, e.g. sodium aluminate, to form the oxirane groups on the chlorohydrin ether.

The glycidyl ethers used in the invention include 1,2-epoxy-containing polyethers of polyhydric alcohols such as polyglycidyl ethers thereof like diglycidyl ether of ethylene glycol, propylene glycol, trimethylene glycol, butylene glycol, diethylene glycol, triethylene glycol, glycerol, dipropylene glycol and the like. Other typical ethers of this class include glycidyl ethers of polyhydric alcohols having a 1,2-epoxy equivalency greater than one such as the polyglycidyl ethers of glycerol, diglycerol, erythritol, pentaglycerol, pentaerythritol, mannitol, sorbitol, polyallyl alcohol, polyvinyl alcohol and the like.

The scope of the invention encompasses epoxy ethers formed by reacting dihydric phenols with epichlorohydrin in alkaline solution. Any of the various dihydric phenols are used in preparing the glycidyl ethers including mononuclear phenols like resorcinol, catechol, hydroquinone, etc., or polynuclear phenols like bis-(4-hydroxyphenyl)-2,2-propane (bisphenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary butyl phenyl)-2,2-propane, bis-(2-dihydroxynaphthyl)-methane, 1,5-dihydroxy naphthalene, etc. Obviously the molecular weight and the chain length of the resulting ether may be varied by varying the proportion of epichlorohydrin to di and other polyhydric phenols.

Epoxy glycidyl esters can be prepared by reacting epichlorohydrin and organic acids, or salts thereof; by reacting glycidol with acid chlorides; or by reacting the carboxyl group directly in the presence of a catalyst. See "Handbook of Epoxy Resin" by Lee and Neville, McGraw-Hill, New York, p. 2–18 et seq. (1967) which is incorporated herein by reference. Any of the epoxy glycidyl esters and epoxy glycidyl ethers disclosed in the "Handbook of Epoxy Resin" by Lee and Neville, McGraw-Hill, New York, (1967), which is incorporated herein by reference, may be used to form the tackifiers of the invention.

As mentioned above, aliphatic epoxy compounds can also be used to react with the alkyl phenol novolacs to form AB. The aliphatic epoxides may contain 3 to 12 carbon atoms. By aliphatic epoxides is meant the epoxide derivatives of olefins. The olefin can contain alkyl or aryl substitution. Aliphatic epoxides within the meaning of the invention of the above-identified application include propylene oxide and Epon 871. In addition, cycloaliphatic epoxide resins can be employed. Exemplary of cycloaliphatic resins is tetrahydrophthalic-diglycidyl ester resin, e.g., Araldite resin CY-182 or Araldite CY-178 which has the following chemical structure:

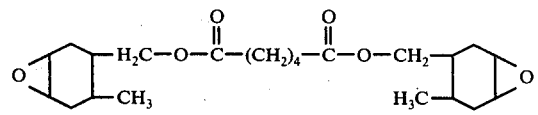

As stated above, after the formation of the phenolic novolac, the phenolic novolac can be isolated and reacted with the oxirane bearing material, or, alternatively, the phenolic novolac need not be isolated but reacted during its distillation upheat with the oxirane material in situ.

The alkyl-phenol novolac and the oxirane bearing material are mixed and distilled between temperature ranges of approximately 130° C and 250° C under pressures ranging from atmospheric to less than one inch of mercury. Melting points (Ball and Ring) are determined.

As little as 1% by weight and as much as 38% by weight of oxirane bearing materials have been reacted with alkyl phenol novolacs in accordance with the invention. Generally, as little as 5% by weight and up to 20% by weight of oxirane bearing materials are reacted with alkyl phenol novolacs in accordance with the invention. Optimum results are obtained when 8 to 12% by weight of oxirane bearing material is reacted with alkyl phenol novolacs in accordance with the invention. Generally, with epoxy resin levels within the 5 to 20 weight percent range based on the phenol load, the preferred formaldehyde mole ratios for resins based, for instance, on octyl-, nonyl-, or dodecyl-phenol would be 0.60 to 1.2 (F/P). The important consideration is that the final product has the proper compatibility with the elastomer compound.

Formaldehyde levels in the novolac resin may vary depending upon the following factors: the nature of the alkyl phenol, in that the longer the alkyl chain substituent on the phenol, the greater the formaldehyde load required to yield a given melt point; the ratio of alkyl phenol-formaldehyde resin to epoxy resin, in that the higher the epoxy resin level, the higher the melt point of the resultant tackifier resin; and the epoxy resin molecular weight, in that the optimum formaldehyde ratio of a tackifier resin utilizing Epon 828 may be different from that utilizing Epon 1009.

The product AB is substantially a thermoplastic material. During the formation of AB, the oxirane bearing material gives some cross-linking; yet the degree of cross-linking is so small that the nature of AB remains substantially thermoplastic. The etherification of the phenol groups also results in the reduction of hydrophilic properites which provides for better tackification, by tackifiers of the invention, under high humidity conditions.

The product AB has been examined with respect to the completeness of the reaction between the oxirane material and the novolac. The weight per epoxy equivalent (WPE) has been determined. The WPE of the tackifiers of the invention, range from 775 upward, preferably at least 2000, more preferably 4,000 or higher, e.g. to 20,000 or even to 100,000 or even higher; preferably the WPE is between 20,000 and 100,000, indicating substantially zero residual epoxy content.

The melt point (Ball and Ring) of the products AB may be controlled. The melt points may be controlled by controlling the physical conditions under which the alkyl phenol novolacs and oxirane bearing materials are distilled together to form the product AB. Distillation temperatures range between 160° and 220° C, under vacuum of 10 inches to 25 inches. By controlling the distillation temperatures, products result with melt point (Ball and Ring) ranging between 60° and 160° C. Products AB with melting points of 60°–110° C. are prefered for use as stock additives, while Products AB with melting points of 110°–160° C are preferred for use in rubber cements.

The oxirane material-alkyl phenol novolac reaction products are excellent tackifiers for various elastomers. By elastomers is meant normally solid, alpha-olefin hydrocarbon, halohydrocarbon and hydrocarbon acrylonitrile polymers containing sulfur-curable unsaturation. Thus, the term elastomers includes natural and synthetic rubbers. By elastomers is meant SBR, natural rubber, ethylenepropylene non-conjugated polyene, e.g. non-conjugated diene (EPDM), butyl, chloroburyl rubbers, e.g. cis-isoprene polymer, polybutadiene, polychloroprene, butadiene-acrylonitrile copolymer. By halohydrocarbon polymers is meant halogenated hydrocarbon polymers. These include chlorobutyl rubbers as well as polychloroprene. By hydrocarbon-acrylonitrile elastomers is meant copolymers of acrylonitrile and one or more olefins, e.g. butadiene-acrylonitrile copolymers and elastomeric acrylonitrile-butadiene-styrene terpolymers.

The useful elastomers are for example polyolefin polymers such as butyl rubber (i.e. copolymers of isobutylene with a small amount of a diolefin, e.g. isobutylene-butadiene (98.5:1.5) or isobutylene/isoprene) as disclosed for example, in Sparks U.S. Pat. No. 2,356,128. The olefin polymers are normally solids having molecular weights of 10,000 to 1,000,000 or even higher.

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 54 molar percent) propylene and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

Useful in the present specification and claims are nonconjugated polyolefins including aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene, 5-ethylidene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g. ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621; and 3,136,739; in British Pat. No. 880,904 and in Belgian Pat. No. 623,698.

Terpolymers and other EPDM rubbers from ethylene, propylene and dicyclopentadiene are exemplified in Tarney U.S. Pat. No. 3,000,866; Adamek U.S. Pat. No. 3,136,739 and Dunlop (British) Pat. No. 880,904. EPDM rubbers from ethylene, propylene and 1,4-hexadiene are exemplified in Gresham U.S. Pat. No. 2,933,480. As shown in Gresham, other suitable nonconjugated diolefins are 1,4-pentadiene; 2-methyl-1,5-hexadiene, 3,3-dimethyl-1, 5-hexadiene, 1,7-octadiene, 1,9-decadiene, 1,19-eicosadiene, 1,4-hexadiene, 1,9-octadecadiene, 6-methyl-1,5-heptadiene, 7-methyl-1,6-octadiene, 11-ethyl-1,11-tridecadiene.

EPDM rubbers from ethylene, propylene and 5-methylene-2-norbornene are exemplified in U.S. Pat. No. 3,093,621. Suitable norbornadienes, e.g., 2-methyl norbornadiene, 2-ethyl norbornadiene, 2-n-heptyl norbornadiene are shown in Gladding U.S. Pat. No. 3,063,973 and bicyclo compounds such as bicyclo (2,2,2) heptadiene-2,5 are shown in Dunlop (British) Pat. No. 880,904. The use of cyclooctadiene-1,5 and other cyclodienes is shown in Montecatini (Belgium) Pat. No. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

They are particularly useful with polyolefin polymers including natural rubber, poly-cis-isoprene, polybutadiene, poly-2,3-dimethyl butadiene-1,3, poly-2-chlorobutadiene-1,3, butadiene-styrene copolymer (SBR), butadiene-acrylonitrile copolymer (e.g. 75:15), butadiene-ethyl acrylate copolymer, acrylonitrile-butadiene-styrene copolymer (ABS).

As stated above, the tackifiers may be used in the aforementioned elastomers as tire stock tackifiers, cement tackifiers, and tackifiers for any rubber application requiring gree tack. As examples of rubber products which require green tack in their construction are tires, belts and hoses. These tackifiers may also be utilized in rubber-based adhesives containing SBR, natural rubber, EPDM, butyl and chlorobutyl rubbers, both of the solvent and the emulsion type.

Butyl rubbers are made by reacting isobutylene with very minor amounts of isoprene or other conjugated diene sufficient to provide sites for sulfur cure, e.g. see Sparks U.S. Pat. No. 2,356,128 the entire disclosure of which is hereby incorporated by reference. Chlorobutyl rubbers are chlorinated butyl rubbers. Another suitable rubber is natural rubber. Styrene-butadiene elastomers are also employed to advantage in formulations with tackifiers of the invention. Of course, mixtures of two or more elastomers can be used.

When compounded with elastomers, the tackifiers can comprise 0.5 to 20 parts by weight per 100 parts of elastomer for formulation. In carcasses, 3 to 12 parts by weight of tackifier are conventionally used per 100 parts of rubber, while according to the invention less of the more effective tackifier may be employed in this instance. In cement tackifiers, 20 parts of tackifier per 100 parts by weight of rubber may be used.

In formulating the elastomer and tackifier compositions, the sulfur vulcanizing agent, a meta oxide and one or more promoters can be employed, as well as carbon. Generally, the weight of carbon black employed is at least about half that of the elastomer, and can be as much as 100 parts or more per 100 part of rubber. Frequently, about 60 parts by weight of carbon black to 100 parts by weight of elastomer are employed. It is known that the elastomer and the carbon black must adhere well to each other if the composition is to provide adequate "green" and cured bond strength. High carbon black concentration improves the aging characteristics of the cured composite articles.

In conventional sulfur curing systems, the sulfur curing system can include (as can the tackifier-elastomer compositions of the invention) a metal oxide, a curing accelerator and promoter, and sulfur. Concentrations above 2 parts of sulfur, based on 100 parts of elastomer, are usually unnecessary. At concentrations of 3 to 10 parts by weight of metal oxide per 100 parts by weight of copolymer, the rate and state of cure are satisfactory. In addition to use in undertread and carcass stocks for tires, belts, and hoses, the tackifier-elastomer compositions of the invention also may be used in adhesives containing SBR, natural, EPDM, butyl and chlorobutyl rubbers, both of the solvent type and the emulsion type.

The examples which follow are meant to be exemplary, only, of the invention. It will be understood that it is not intended that the examples limit the invention to the embodiments therein. On the contrary, it is intended that the examples are exemplary and meant to cover all alternatives, modifications and equivalents as may be included within the spirit and scope of the invention as defined by the appended claims.

Unless otherwise indicated all parts and percentages are by weight.

EXAMPLES

RESIN PREPARATION

EXAMPLE 1

1258 grams of dodecyl phenol, 150 grams of xylene, and 14 grams of toluene sulfonic acid were added to a three-necked 5-liter flask equipped with an agitator, a thermometer and a condenser. The temperature was raised to 100° C, and then 430 grams of 37% uninhibited formaldehyde was added over approximately 20 minutes. The reaction was mentioned at reflux temperatures for 4 hours after the addition of formaldehyde. Thereafter, 850 grams of xylene and 500 grams of water were added to the reaction mixture, followed by the addition of 7 grams of 50% sodium hydroxide solution, which brought the pH of the reaction mixture to about 4-5. The mixture was agitated for 30 minutes at 100° C. The water layer was then allowed to separate and was decanted. The resin was then washed at 100° C for 30 minutes with 1,000 grams of water. The water layer was decanted and the resin was washed again with a 1,000 grams of water in a similar manner. The water layer was again decanted and the resin distilled to 180° C under 25 inches of vacuum. At distillation temperature of about 180° C, 15 grams of Epon 829 were added to the distillation vessel and distillation was continued to 220° under 25 inches of vacuum. The resin was held at 220° C for 1 hour and then poured into a pan to cool. The yield was approximately 1327 grams with a Melt Point (Ball and Ring), of 97° C.

Epon 829 is a liquid epoxy resin based on bisphenol A with a WPE of 193-203 and a viscosity (centipoises) of 30,000 to 70,000, manufactured by Shell Chemical Company.

EXAMPLE 2

To a 5-liter flask equipped as in Example 1, were added

| | |
|---|---|
| Dodecyl phenol | 1258 grams |
| Xylene | 150 grams |
| 37% uninhibited formaldehyde | 430 grams |
| Toluene sulphonic acid | 14 grams |
| Aerosol OT (di-2-ethyl hexyl sodium sulfosuccinate) | 2 grams |

The temperature was brought to reflux and held for 4 hours. After 4 hours of refluxing, 850 grams of xylene; 1,000 grams of water and 7 grams of 50% sodium hydroxide were added to the reaction vessel with agitation of the reaction mixture. The resin layer was allowed to settle for 30 minutes. The water layer was decanted and the resin was distilled to 160° C at 10 inches of vacuum. 120 grams of Epon 829 were then added slowly through a dropping funnel. The vacuum on the system was increased to 20 inches and the temperature was raised to 180° C and held until the melt point (Ball and Ring) of the resin was 93° C. The resin was poured into a pan to cool; the yield was 1427 grams.

EXAMPLE 3

A similar procedure to Example 2 was used for Example 3 employing the following reactants:

| | | | | |
|---|---|---|---|---|
| A. Dodecyl phenol | 1258 grams | F. Water | 500 grams |
| B. Xylene | 150 grams | G. 50% Sodium Hydroxide | 9 grams |
| C. 37% Uninhibited formaldehyde | 430 grams | H. Water | 1000 grams |
| D. Toluene sulfonic acid | 21 grams | I. Araldite CY-182 | 100 grams |
| E. Xylene | 1200 grams | | |

Employing a procedure similar to that in Example 2, a resin with a melting point (Ball and Ring) of 98° C was produced with a yield of approximately 1464 grams.

Araldite CY-182 is a cycloaliphatic epoxy resin, specifically tetrahydrophthalic diglycidyl ester resin.

EXAMPLE 4

| | | | | |
|---|---|---|---|---|
| A. Nonyl phenol | 1060 grams | F. Water | 500 grams |
| B. Xylene | 150 grams | G. 50% Sodium Hydroxide | pH 5-8 |
| C. 37% Uninhibited formaldehyde | 430 grams | H. Water | 1000 grams |

-continued

| D. Toluene Sulfonic Acid | 14 grams | I. Epon 829 | 250 grams |
| E. Xylene | 850 grams | | |

The above materials were reacted utilizing the procedure of Example 2. A sufficient amount of G, the solution of 50% sodium hydroxide, was added to obtain a pH of 5–8. The finished product had a melting point (Ball and Ring) of 114° C. The yield was 1300 grams.

EXAMPLE 5

| A. Dodecyl phenol | 1258 grams | F. Water | 500 grams |
| B. Xylene | 150 grams | G. 50% Sodium Hydroxide | pH 4–5 |
| C. 37% Uninhibited formaldehyde | 430 grams | H. Water | 1000 grams |
| D. Toluene Sulfonic Acid | 21 grams | I. Styrene oxide | 120 grams |
| E. Xylene | 1200 grams | | |

A sufficient amount of G, the slution of 50% sodium hydroxide was added to bring the pH of the reaction mixture to about 4–5. The above materials were reacted according to the procedure of Example 2 except that material I was added dropwise at 115° C, held for 10 minutes and the resin was distilled to 220° C and held for a melting point (Ball and Ring) of 95° C. The yield was 1461 grams.

EXAMPLE 6

| A. Dodecyl phenol | 1258 grams | F. Water | 500 grams |
| B. Xylene | 150 grams | G. 50% Sodium Hydroxide | pH 5–7 |
| C. 37% Uninhibited formaldehyde | 430 grams | H. Water | 1000 grams |
| D. Toluene Sulfonic Acid | 21 grams | I. Propylene Oxide | 480 grams |
| E. Xylene | 1200 grams | | |

A sufficient amount of G was added to bring the pH of the reaction mixture to about 5–7. The above materials were reacted according to the procedure of Example 2 except material I was added and held at 110° C for 1 hour prior to distillation. The melting point (Ball and Ring) was 88° C and the yield was 1322 grams.

| Intermediate for Examples 7, 8 and 9. | |
| --- | --- |
| A. p-tert. octyl phenol | 3090g |
| B. conc. Sulfuric Acid | 30g |
| C. Diisobutylene | 588g |
| D. 37% formaldehyde | 1442g |
| E. Xylene | 2800g |
| F. Water | 1500g |
| G. 50% Sodium Hydroxide | 40g |

Materials A and B were added to a 7½ gallon resin kettle set for reflux. Heat was applied to raise the temperature to 300° F. Material C was added over 1 hour and the mixture was refluxed for 6 hours. The alkylated phenol was cooled to 212° F, and D was added over a period of ¾ hour. The mixture was refluxed for 2 hours, then E and F were added and mixed for ½ hour at 90° C. Material G was added and mixing was continued for an additional 30 minutes. Agitation was then stopped and the water layer was decanted. The resin was then distilled to 300° F to yield a resin with a MP (B&R) of 100° C.
This intermediate is designated as Resin D.

EXAMPLE 7

| A. Resin D | 500 grams |
| B. Xylene | 200 grams |
| C. Epon 1009 | 75 grams |

A five-liter flask was set for distillation. A and B were added and heated to 130° C. Material C was then added. Distillation was continued to 190° C. Vacuum was then applied (23 inches). The distillation was held at 180° C for a melting point (Ball and Ring) of 84° C. The yield was 563 grams.

Epon 1009 is an epoxy resin based on diglycidyl ether of bisphenol A with WPE of 2500–4000 manufactured by Shell Chemical Co., Resins Division, 280 So. Harrison Street, E. Orange, New Jersey 07018.

EXAMPLE 8

| A. Resin D | 500 grams |
| B. Xylene | 200 grams |
| C. DEN-438 | 75 grams |

A similar procedure to that used in Example 7 was used for Example 8. It yielded a resin with a melting point (Ball and Ring) of 97° C.

DEN-438 is an epoxidized polyglycidyl ether of phenol-formaldehyde novolac resin with a WPE of 176–181 and a viscosity (centipoises) of 35000 to 70000 at 52° C, by Dow Chemical Co. of Midland, Michigan.

EXAMPLE 9

| A. Resin D | 500 grams |
| B. Xylene | 200 grams |
| C. Epon 828 | 75 grams |

A similar procedure to Example 7 was used for Example 9. It yielded a resin with a melting point (Ball and Ring) of 97° C.

Epon 828 is an epoxy resin based on bisphenol A with a WPE of 185–192 and a viscosity (centipoise) of 10000–16000, by Shell Chemical Company.

EXAMPLE 10

| | |
|---|---|
| A. Dodecyl Phenol | 1258 g. |
| B. Xylene | 150 g. |
| C. Aqueous Formaldehyde (37%) | 430 g. |
| D. Toluene Sulfonic Acid | 14 g. |
| E. Water | 1000 g. |
| F. Triethanolamine | 22 g. |
| G. Epon 828 | 100 g. |

In a manner similar to that described in Example 2 above, the reaction product of Epon 828 and a dodecyl phenolformaldehyde condensation product was prepared utilizing the above ingredients in the amounts indicated. The yield was 1237 g. at a MP (B&R) of 97° C.

EXAMPLE 11

| | |
|---|---|
| A. p-t-octylphenol | 950 g. |
| B. Xylene | 355 g. |
| C. Aqueous Formaldehyde (37% Assay) | 254 g. |
| D. Oxalic Acid | 6.5 g. |
| E. Epon 829 | 120 g. |

In a manner similar to that described in Example 2 above, the reaction product of Epon 829 and an octylphenolformaldehyde condensation product was prepared utilizing the above ingredients in the amounts indicated. The yield of this resin was 1072g. and the melt point (Ball and Ring) was 100° C.

EXAMPLE 12

| | |
|---|---|
| A. Dodecyl Phenol | 5032 g. |
| B. Xylene | 600 g. |
| C. Aqueous Formaldehyde (37%) | 1720 g. |
| D. Toluene Sulfonic Acid | 84 g. |
| E. Water | 5000 g. |
| F. Aqueous Sodium Hydroxide (50%) | 28 g. |
| G. Epon 829 | 500 g. |

In a manner similar to that described in Example 2 above, the reaction product of Epon 829 and a dodecyl phenolformaldehyde condensation product was prepared utilizing the above ingredients in the amounts indicated. The yield of this resin was 6432 g. and the melt point (Ball and Ring) was 93° C.

EXAMPLE 13

| | |
|---|---|
| A. p-t-Octylphenol | 950 g. |
| B. Xylene | 355 g. |
| C. Aqueous Formaldehyde (37%) | 254 g. |
| D. Oxalic Acid | 6.5 g. |
| E. Epon 812 | 86 g. |

In a manner similar to that described in Example 2 above, the reaction product of Epon 812 and an octylphenolformaldehyde condensation product was prepared utilizing the above ingredients in the amounts indicated. The yield of this resin was 1072g. and the melt point (Ball and Ring) was 102° C.

Epon 812 is an epoxy resin based on glycerine with a WPE of 150–170 and a viscosity (centipoises) of 12,000 to 20,000 made by Shell Chemical Company.

EXAMPLE 14

| | |
|---|---|
| A. p-t-Octylphenol | 708 g. |
| B. Xylene | 265 g. |
| C. Aqueous Formaldehyde (37%) | 248 g. |
| D. Oxalic Acid | 5.0 g. |
| E. Aerosol OT | 0.2 g. |
| F. Araldite CY-178 | 60 g. |

In a manner similar to that described in Example 2 above, the reaction product of Araldite CY-178 and an octylphenolformaldehyde condensation product was prepared utilizing the above ingredients in the amounts indicated. The yield of this resin was 768 g. and the melt point (Ball and Ring) was 118° C.

Araldite CY-178 is a cycloaliphatic epoxy resin having the following structural formula:

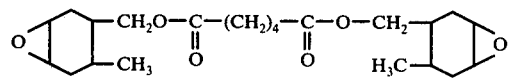

It is manufactured by CIBA-Geigy Corporation.

EXAMPLE 15

| | |
|---|---|
| A. p-t-Octylphenol | 708 g. |
| B. Xylene | 265 g. |
| C. Aqueous Formaldehyde (37%) | 248 g. |
| D. Oxalic Acid | 5.0 g. |
| E. Aerosol OT | 0.2 g. |
| F. XB-2793 Resin | 60 g. |

In a manner similar to that described in Example 2 above, the reaction product of XB-2793 Resin and an octylphenolformaldehyde condensation product was prepared utilizing the above ingredients in the amounts indicated. The yield of this resin was 798 g. and the melt point (Ball and Ring) was 105° C.

XB-2793 resin is a liquid hydantoin epoxy resin manufactured by CIBA-Geigy Corporation.

EXAMPLE 16

| | |
|---|---|
| A. p-t-Octylphenol | 708 g. |
| B. Xylene | 265 g. |
| C. Aqueous Formaldehyde (37%) | 248 g. |
| D. Oxalic Acid | 5.0 g. |
| E. Aerosol OT | 0.2 g. |
| F. XB-2818 Resin | 60 g. |

In a manner similar to that described in Example 2 above, the reaction product of XB-2818 Resin and an octylphenolformaldehyde condensation product was prepared utilizing the above ingredients in the amounts indicated. The yield of this resin was 771 g. and the melt point (Ball and Ring) was 127° C.

XB-2818 is a high viscosity, trifunctional epoxy resin based on hydantoin. It is manufactured by CIBA-Geigy Corporation.

Tack Testing

The resins produced in accordance with Examples 1 through 12 were tested in elastomer Compounds I through IV, as set forth below. In each compound formula, all the ingredients except the resin were milled on a 2-roll rubber mill to give a master batch. The specific conditions employed were as follows: all materials were milled in at 175° F over a period of 4 to 6 minutes. Generally some variations from these conditions are acceptable, particularly 3 to 10 minutes at 100 to 250° F, depending on equipment, and the like.

The tackifier resin was milled into the rubber stock as the last ingredient and the stock was sheeted off at a thickness of about ¼ inch.

The resins produced in Examples 1 through 13 were tested in the following formulations, Compounds I through V:

Compound I

|  | Parts |
|---|---|
| OE SBR (Synpol 1708) | 68.75 |
| Smoked Sheet | 50 |
| HAF Black | 65 |
| Circosol 4240 | 16.5 |
| Zinc Oxide | 3.0 |
| Stearic Acid | 1.0 |
| Neozone D | 1.0 |
| Santocure | 1.2 |
| Diphenyl guanidine | 0.3 |
| Sulfur | 2.0 |
| Resin | 3.0 |

Synpol 1708 is a 37½ percent oil-modified styrene-butadiene elastomer manufactured by Texas-U.S. Chemical Company.

Circosol 4240 is a naphthenic oil manufactured by Sun Oil Company.

Neozone D is N-phenyl-beta-naphthylamine manufactured by E. I. DuPont.

Santocure is N-cyclohexyl-2-benzothiazolesulfenamide manufactured by Monsanto.

Compound II

|  | Parts |
|---|---|
| Royalene 306 | 100 |
| HAF | 80 |
| Sundex 790 | 40 |
| Zinc Oxide | 5 |
| Stearic Acid | 1 |
| Sulfur | 2 |
| Mercaptobenzothiazoyl sulfide | 0.5 |
| Tetra-methyl-thiuram monosulfide | 1.5 |
| Resin | 6 |

Royalene 306 is an ethylene-propylene-diene nonconjugated terpolymer manufactured by Uniroyal Chemical Company. Physical properties of Royalene 306 are as follows: Mooney Viscosity of 90; specific gravity of 0.865, and iodine number of 10. The unsaturation of te terpolymer is pendant to the saturated polymer chain.

Sundex 790 is an aromatic hydrocarbon oil manufactured by Sun Oil Company.

Compound III

|  | Parts |
|---|---|
| HT-1068 | 100 |
| HAF Black | 60 |
| Flexon 845 | 10 |
| Zinc oxide | 5 |
| Stearic Acid | 1 |
| Sulfur | 1 |
| Mercapto-benzothiazoyl sulfide | 0.75 |
| Resin | 4 |

HT-1068 is a chlorinated isobutylene-isoprene elastomer manufactured by Exxon. HT-1068 chlorobutyl rubber has the following physical properties: Mooney Voscosity range of 50 to 60; specific gravity of 0.92; and a viscosity average molecular weight of 350,000 to 400,000.

Flexon 845 is a paraffinic petroleum oil manufactured by Humble Oil and Refining Company.

Compound IV

|  | Parts |
|---|---|
| Butyl 218 | 100 |
| HAF Black | 60 |
| Flexon 845 | 10 |
| Zinc Oxide | 5 |
| Stearic Acid | 1 |
| Sulfur | 1 |
| Mercapto-benzothiazoyl sulfide | 0.75 |
| Resin | 4 |

Butyl 218 is an isobutylene-isoprene elastomer manufactured by Exxon.

After the tackifier resin was milled into the rubber stock as the last ingredient and the stock was sheeted off at a thickness of approximately ¼ inch, the stock was then cut into ⅜ inch strips and molded into ½ × ¼ × 8 inch strips. The molding conditions were 100° F, 2,000 psi, 5 minutes with a cool down to 75° F under pressure. The molded strips were then cut into 1¼ inch segments and subjected at various time intervals to a tack-test contact area for a period of 5 seconds. The strips were then pulled apart in a tack tester described by John Skewis of Uniroyal, in Rubber Chemistry and Technology, 38, 689 (1965), which is incorporated by reference herein. This Tack Tester is capable of varying the contact pressure and the separation pressure. The time is measured for separation: the longer the separation time, the better the tack. The elastomer strips were subjected to both ambient storage conditions and 95 percent relative humidity at 90° F over a total period of 96 hours. Samples were withdrawn at periodic intervals during the 96 hours and were tested for tack as indicated below.

In each of the Compounds, formulae I through IV, Resin refers to resins produced in accordance with Examples 1 through 12. Accordingly, in Table I below, the formulation of Compound I was repeated for each of Examples 1 through 12 employing 3 grams of the resin produced by Examples 1 through 12, respectively. In Tables III and IV, a compound formula of Compound II was prepared employing 6 grams of resin, produced in accordance with each of Examples, 1, 2, 6, 10, 11 and 12, respectively. In Tables VII and VIII, formulations using Compound III, employing 4 grams of resin produced in accordance with Examples 11 and 12, respectively, were tested. In Tables V and VI, formulations of Compound IV, which employs 4 grams of the resins of Examples 11 and 12, were tested.

The results of Tables I through VIII represent the measurement of tack values of formulations in accordance with Compounds I through IV, employing the tackifiers produced in Examples 1 through 12.

Table 1

Compound I tack values as measured under ambient conditions using 500 g contact weight and 500 g separation weight.

| Resin of Example | Tack After 24 Hours | Tack After 48 Hours | Tack After 72 Hours | Tack After 96 Hours |
|---|---|---|---|---|
| 1 | 53 | 62 | 67 | 70 |
| 2 | 100+ | 100+ | 99 | 100+ |
| 3 | 29 | 36 | 39 | 21 |
| 4 | 48 | 52 | 55 | 60 |
| 5 | 32 | 27 | 43 | 23 |
| 6 | 57 | 80 | 78 | 72 |
| 7 | 19 | 18 | 20 | 17 |
| 8 | 13 | 17 | 15 | 21 |
| 9 | 22 | 27 | 33 | 29 |
| 10 | 90 | 90 | 99 | 100+ |
| 11 | 95 | 91 | 100+ | 87 |
| 12 | 83 | 87 | 94 | 89 |

Table 1-continued

Compound I tack values as measured under ambient conditions using 500 g contact weight and 500 g separation weight.

| Resin of Example | Tack After 24 Hours | Tack After 48 Hours | Tack After 72 Hours | Tack After 96 Hours |
| --- | --- | --- | --- | --- |
| SP-1068 | 6 | 10 | 17 | 9 |

All values are "Seconds to Separation".

SP-1068 is a commercially available, p-t-octyl phenol-formaldehyde tackifier resin manufactured by Schenectady Chemicals, Inc.

Table II

Compound I tack values after aging at 90° F and 95 percent relative humidity using 500 g contact weight and 500 g separation weight.

| Resin of Example | Tack After 24 Hours | Tack After 48 Hours | Tack After 72 Hours | Tack After 96 Hours |
| --- | --- | --- | --- | --- |
| 1 | 47 | 59 | 62 | 43 |
| 2 | 90 | 100+ | 100+ | 89 |
| 3 | 30 | 32 | 43 | 30 |
| 4 | 37 | 43 | 52 | 39 |
| 5 | 28 | 27 | 22 | 18 |
| 6 | 60 | 85 | 67 | 61 |
| 7 | 23 | 19 | 15 | 14 |
| 8 | 15 | 22 | 18 | 17 |
| 9 | 37 | 20 | 18 | 16 |
| 10 | 100+ | 93 | 90 | 82 |
| 11 | 97 | 100+ | 100+ | 70 |
| 12 | 75 | 89 | 85 | 82 |
| SP-1068 | 7 | 6 | 0 | 0 |

All values are "Seconds to Separation".

Table III

Compound II tack values as measured under ambient conditions using 500 g contact weight and 200 g separation weight.

| Resin of Example | Tack After 24 Hours | Tack After 48 Hours | Tack After 72 Hours | Tack After 96 Hours |
| --- | --- | --- | --- | --- |
| 1 | 52 | 60 | 67 | 70 |
| 2 | 100+ | 95 | 100+ | 100+ |
| 6 | 77 | 86 | 80 | 70 |
| 10 | 90 | 100+ | 100+ | 95 |
| 11 | 80 | 90 | 98 | 90 |
| 12 | 70 | 90 | 82 | 83 |
| SP-1068 | 10 | 17 | 22 | 11 |

All values are "Seconds to Separation".

Table IV

Compound II tack values after aging at 90° F and 95 percent relative humidity using 500 g contact weight and 200 g separation weight.

| Resin of Example | Tack After 24 Hours | Tack After 48 Hours | Tack After 72 Hours | Tack After 96 Hours |
| --- | --- | --- | --- | --- |
| 1 | 32 | 40 | 51 | 40 |
| 2 | 90 | 100+ | 100+ | 80 |
| 6 | 27 | 45 | 53 | 39 |
| 10 | 90 | 90 | 99 | 80 |
| 11 | 70 | 100+ | 81 | 83 |
| 12 | 52 | 77 | 50 | 61 |
| SP-1068 | 17 | 13 | 0 | 0 |

All values are "Seconds to Separation".

Table V

Compound IV tack values as measured under ambient conditions using 500 g contact weight and 500 g separation weight.

| Resin of Example | Tack After 24 Hours | Tack After 48 Hours | Tack After 72 Hours |
| --- | --- | --- | --- |
| 11 | 74 | 100+ | 100+ |
| 12 | 85 | 100+ | 100+ |
| SP-1068 | 28 | 52 | 50 |

All values are "Seconds to Separation".

Table VI

Compound IV tack values after aging at 90° F and 95 percent relative humidity using 500 g contact weight and 500 g separation weight.

| Resin of Example | Tack After 24 Hours | Tack After 48 Hours | Tack After 72 Hours |
| --- | --- | --- | --- |
| 11 | 80 | 80 | 74 |
| 12 | 91 | 100+ | 95 |
| SP-1068 | 50 | 50 | 27 |

All values are "Seconds to Separation".

Table VII:

Compound III tack values as measured under ambient conditions using 500 g contact weight and 500 g separation weight.

| Resin of Example | Tack After 24 Hours | Tack After 48 Hours | Tack After 72 Hours | Tack After 96 Hours |
| --- | --- | --- | --- | --- |
| 11 | 88 | 75 | 86 | 100+ |
| 12 | 100+ | 100+ | 100+ | 100+ |
| SP-1068 | 53 | 26 | 25 | 51 |

All values are "Seconds to Separation".

Table VIII:

Compound III tack values after aging at 90° F and 95 percent relative humidity using 500 g contact weight and 500 g separation weight.

| Resin of Example | Tack After 24 Hours | Tack After 48 Hours | Tack After 72 Hours | Tack After 96 Hours |
| --- | --- | --- | --- | --- |
| 11 | 82 | 71 | 88 | 91 |
| 12 | 100+ | 88 | 94 | 100+ |
| SP-1068 | 3 | 20 | 20 | 30 |

All values are "Seconds to Separation".

Table IX:

Compound V tack values as measured under ambient conditions using 1000 g contact weight and 200 g separation weight. Compound V is the same as compound II except five parts of resin were utilized in place of six parts of resin.

| Resin of Example | Tack After 24 Hours | Tack After 48 Hours | Tack After 72 Hours | Tack After 96 Hours |
| --- | --- | --- | --- | --- |
| 13 | 100+ | 100+ | 100+ | 100+ |
| SP-1068 | 14 | 7 | 20 | 35 |

All values are "Seconds to Separation".

Table X:

Compound V tack values after aging at 90° F. and 95 percent relative humidity using 1000 g contact weight and 200 g separation weight.

| Resin of Example | Tack After 24 Hours | Tack After 48 Hours | Tack After 72 Hours | Tack After 96 Hours |
| --- | --- | --- | --- | --- |
| 13 | 100+ | 100+ | 100+ | 100+ |
| SP-1068 | 14 | 9 | 22 | 62 |

All values are "Seconds to Separation".

Table XI:

Compound I tack values as measured under ambient conditions using 1000 g. contact weight and 200 g. separation weight.

| Resin of Example | Tack After 24 Hours | Tack After 48 Hours | Tack After 72 Hours | Tack After 96 Hours |
| --- | --- | --- | --- | --- |
| 14 | 24 | 30 | 41 | 38 |
| 15 | 17 | 35 | 42 | 34 |
| 16 | 20 | 98 | 100 | 100 |
| SP-1068 | 16 | 20 | 15 | 19 |

All values are "Seconds to Separation."

Table XII:

| Compound I tack values after aging at 90° F. and 95 percent relative humidity using 1000 g. contact weight and 200 g. separation weight. | | | | |
|---|---|---|---|---|
| Resin of Example | Tack After 24 Hours | Tack After 48 Hours | Tack After 72 Hours | Tack After 96 Hours |
| 14 | 15 | 29 | 34 | 62 |
| 15 | 10 | 10 | 16 | 39 |
| 16 | 15 | 22 | 95 | 100 |
| SP-1068 | 4 | 5 | 5 | 5 |

All values are "Seconds to Separation."

Thus, it is apparent that there has been provided, in accordance with the invention, a new tackifier system that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A tackifier suitable for use with sulfur curable hydrocarbon, halohydrocarbon or hydrocarbon-acrylonitrile elastomers, comprising a resin reaction product AB, wherein A is the residue of an alkyl phenol novolac resin, wherein the alkyl of said alkyl phenol novolac is a hydrocarbon radical of 4 to 16 carbon atoms; and wherein B is a residue of an oxirane bearing material, wherein B comprises 1 to 38 weight percent of AB; wherein AB is substantially a thermoplastic resin, characterized by a WPE of at least 2000.

2. The tackifier of claim 1 characterized by a WPE of at least 4,000.

3. The tackifier of claim 1, wherein the phenol novolac resin is formed of the repeating units

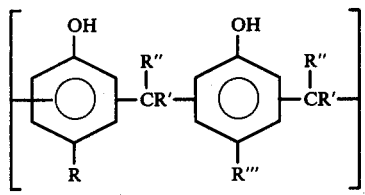

wherein each of R and R''' is alkyl of 4 to 16 carbon atoms and wherein R' and R'' are hydrogen, lower alkyl, aryl or heterocyclic wherein if R' is an alkyl group of more than one carbon atom, aryl or heterocyclic, then R'' must be hydrogen.

4. The tackifier of claim 3, wherein said R' and said R'' are hydrogen.

5. The composition of claim 4, wherein B comprises 5 to 20 percent of AB.

6. The composition of claim 4, wherein B comprises 8 to 12 percent of AB.

7. The composition of claim 5, wherein A has a formaldehyde: phenol molar ratio of 0.6 to 1.2.

8. The composition of claim 4, wherein R is an alkyl of 8 to 12 carbon atoms.

9. The composition of claim 8, wherein B comprises 5 to 20 percent of AB.

10. The composition of claim 8, wherein B comprises 8 to 12 percent of AB.

11. The composition of claim 8, wherein the formaldehyde: phenol molar ratio is 0.6 to 1.2.

12. The composition of claim 3, wherein R is t-octyl.

13. The composition of claim 3, wherein R is dodecyl.

14. The composition of claim 3, wherein said oxirane bearing material is a glycidyl ether, glycidyl ester, aliphatic oxirane, cycloaliphatic oxirane, glycidyl heterocycle or aromatic oxirane.

15. The composition of claim 14, wherein said oxirane material is a glycidyl ether which is derived from bisphenol A, a phenolic novolak, resorcinol or glycerine.

16. The composition of claim 14, wherein said oxirane material is a glycidyl ester which is a tetrahydrophthalic diglycidyl ester resin.

17. The composition of claim 14, wherein said oxirane material is propylene oxide.

18. The composition of claim 14, wherein said oxirane material is a cycloaliphatic oxirane based on cyclohexene or an alkyl substituted cyclohexene.

19. The composition of claim 14, wherein said oxirane material is a glycidyl heterocycle which is a di or tri functional hydantoin epoxy resin.

20. The composition of claim 14, wherein said oxirane material is styrene oxide.

21. The composition of claim 3, wherein the weight per epoxide equivalent of the oxirane bearing material is 58 to 4000.

22. A tackifier suitable for use with sulfur curable hydrocarbon, halohydrocarbon or hydrocarbon-acrylonitrile elastomers, consisting essentially of a resin reaction product AB, where A is the residue of an alkyl phenol novolac resin, wherein the alkyl of said alkyl phenol novolac is a hydrocarbon radical of 4 to 16 carbon atoms; and wherein B is a residue of an oxirane bearing material, wherein B comprises 1 to 38 weight percent of AB, and wherein said oxirane bearing material is a glycidyl ether, glycidyl ester, aliphatic oxirane, cycloaliphatic oxirane, glycidyl heterocycle or aromatic oxirane; wherein AB is substantially a thermoplastic resin, characterized by a WPE in the range of 20,000 to 100,000.

23. The tackifier of claim 22, wherein said alkyl is t-octyl.

* * * * *